(12) United States Patent
Wisecarver (10) Patent No.: US 8,893,654 B2
(45) Date of Patent: Nov. 25, 2014

(54) ROTARY FEED DISPENSING APPARATUS (71) Applicant: Robert Todd Wisecarver, Hamburg, AR (US)

(72) Inventor: Robert Todd Wisecarver, Hamburg, AR (US)

( * ) Notice: Subject to any disclaimer, the term of this patent is extended or adjusted under 35 U.S.C. 154(b) by 75 days.

(21) Appl. No.: 13/651,564

(22) Filed: Oct. 15, 2012

(65) Prior Publication Data

US 2014/0103148 A1  Apr. 17, 2014

(51) Int. Cl.
    A01K 5/02 (2006.01)
(52) U.S. Cl.
    USPC ........................................ 119/51.11
(58) Field of Classification Search
    CPC .................. A01K 5/00; A01K 5/0291
    USPC .............. 119/51.11, 52.1, 57.91, 57.92, 57.5;
                    222/161, 162, 166, 167, 168, 169, 171,
                    222/181.1, 185.1, 227, 228, 230, 236, 237,
                    222/638, 639, 642, 643, 648, 650; 239/668,
                    239/669, 681, 682, 683, 684, 687, 688, 689
    See application file for complete search history.

(56) References Cited

U.S. PATENT DOCUMENTS

| | | | |
|---|---|---|---|
| 2,793,791 A * | 5/1957 | Clark | 222/650 |
| 4,167,248 A * | 9/1979 | Akazawa et al. | 239/683 |
| 4,296,710 A * | 10/1981 | Sillers, III | 119/51.11 |
| 4,565,159 A | 1/1986 | Sweeney | |
| 5,820,035 A | 10/1998 | Johnson et al. | |
| 6,290,099 B1 | 9/2001 | Melton | |
| 7,222,583 B2 | 5/2007 | Foster et al. | |
| 7,302,912 B2 | 12/2007 | Boyer | |
| 7,421,834 B1 * | 9/2008 | Doolan | 53/570 |
| 7,717,063 B2 | 5/2010 | Chang et al. | |
| 2014/0131468 A1 * | 5/2014 | Meritt | 239/7 |

* cited by examiner

Primary Examiner — Isam Alsomiri
Assistant Examiner — Ebony Evans
(74) Attorney, Agent, or Firm — Dale J. Ream (57) ABSTRACT A rotary feed dispensing apparatus includes a reservoir configured to hold feed. The apparatus includes a rotary dispenser having an inlet operatively coupled to the reservoir and a rotary dispenser outlet, the rotary dispenser defining a rotary dispenser interior area configured to selectively receive the feed from the reservoir through the rotary housing inlet. An impellor assembly is rotatably mounted in the rotary dispenser, the impellor assembly having an impellor body portion and at least one impellor end portion pivotally coupled to the impellor body portion. The impellor end portion is movable between an extended configuration and a folded configuration. A motor is operatively coupled to the impellor assembly and configured to rotate the impellor assembly when energized. The impellor end portion is configured to eject the feed from the rotary dispenser through the outlet when the motor is energized and the impellor end portion is at the extended configuration.

11 Claims, 7 Drawing Sheets

ROTARY FEED DISPENSING APPARATUS

BACKGROUND OF THE INVENTION

The present invention relates generally to animal feeding devices and, more particularly, to a rotary feed dispensing apparatus configured to selectively eject stored feed into the air so as to provide feed to animals.

Livestock are often fed from feeding devices such as hay troughs, barrels that hold large quantities of grain or other feed, or even from feed dumped on the ground. Deer and other animals may be fed using centrifugal feeders that distribute feed by distributing it in a 360 degree area. In addition, rotary feeders use an impellor assembly to throw feed into the air in a more focused area.

Although assumably effective for their intended purposes, rotary feeders sometimes jam when the feed material becomes damp and clumpy or includes foreign objects that are unable to be ejected by the impellors. More particularly, clumpy feed material may become lodged in a feed transmission channel and, as a result, feed is not even received into the impellors and is not ejected into the air. Further, clumpy feed material already in an impellor assembly my cause the impellors to jam which, in turn, may cause the motor to burn up.

Therefore, it would be desirable to have a rotary dispensing apparatus for selectively ejecting stored feed into the ambient air. Further, it would be desirable to have a rotary dispensing apparatus having a vibrator for inhibiting clumping of feed in a transmission feed channel that extends between a feed reservoir and a rotary dispenser. In addition, it would be desirable to have a rotary dispensing apparatus in which feed dispensing impellors have pivotal ends that will not jam if clumpy feed is encountered.

SUMMARY OF THE INVENTION

A rotary feed dispensing apparatus according to a preferred embodiment of the present invention includes a reservoir defining a reservoir interior area configured to hold feed. The apparatus includes a rotary dispenser having an inlet operatively coupled to the reservoir and a rotary dispenser outlet, the rotary dispenser defining a rotary dispenser interior area configured to selectively receive the feed from the reservoir through the rotary housing inlet.

An impellor assembly is rotatably mounted in the rotary dispenser interior area, the impellor assembly having an impellor body portion and at least one impellor end portion pivotally coupled to the impellor body portion. The impellor end portion is movable between an extended configuration in a common horizontal plane with the impellor body portion and a folded configuration offset from the horizontal plane. A motor is operatively coupled to the impellor assembly and configured to rotate the impellor assembly when energized. The impellor end portion is configured to eject the feed from the rotary dispenser through the outlet when the motor is energized and the impellor end portion is at the extended configuration.

Therefore, a general object of this invention is to provide a rotary feed dispensing apparatus for selectively ejecting stored feed into the ambient air.

Another object of this invention is to provide a rotary feed dispensing apparatus, as aforesaid, having an impellor assembly configured to rotate within a rotary feed impellor assembly, the impeller assembly having foldable end portions that automatically fold up to avoid a clogging of feed.

Still another object of this invention is to provide a rotary feed dispensing apparatus, as aforesaid, that is configured to transfer feed from hopper to the impeller assembly at predetermined intervals of time.

Yet another object of this invention is to provide a rotary feed dispensing apparatus, as aforesaid, that includes a vibrator that, when energized, breaks up or evenly distributes feed stored in a hopper.

A further object of this invention is to provide a rotary feed dispensing apparatus, as aforesaid, that is easy is to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5b is a sectional view taken along line 5b-5b of FIG. 5a;

DESCRIPTION OF THE PREFERRED EMBODIMENT

A rotary feed dispensing apparatus according to a preferred embodiment of the present invention will now be described with reference to FIGS. 1 to 7 of the accompanying drawings. The rotary feed dispensing apparatus 10 includes a reservoir 20, a rotary dispenser 30, an impellor assembly 50 situated in the rotary dispenser 30, a motor 40 configured to operate the impellor assembly 50 to eject feed into the air.

Figure 6:
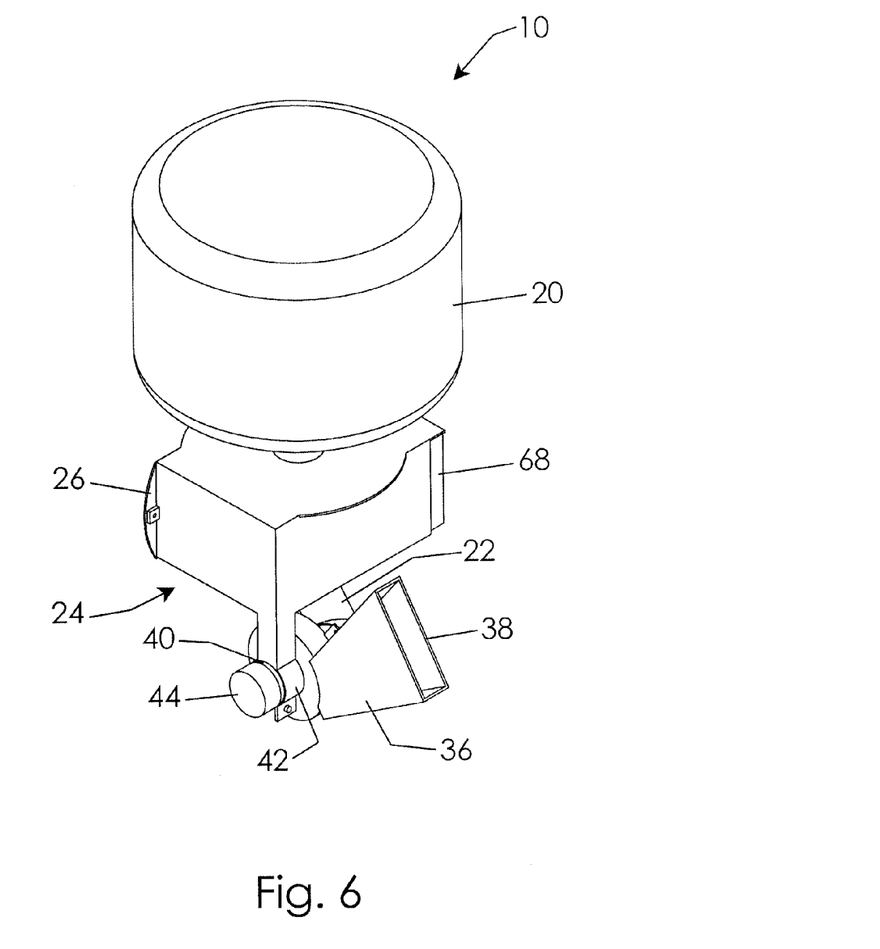
FIG. 6 is a perspective view of the rotary feed dispenser with a hopper coupled to the component housing.

The reservoir 20 is configured to hold a quantity of feed, such as grain or other granular food product (FIG. 6). The reservoir 20 may be removed from the rest of the apparatus 10 as will be described more below, such as to refill it with feed. The reservoir 20 may have a cylindrical configuration although a square, rectangular, or spherical configuration would also work to hold and distribute feed to the rotary dispenser 30.

Figure 4:
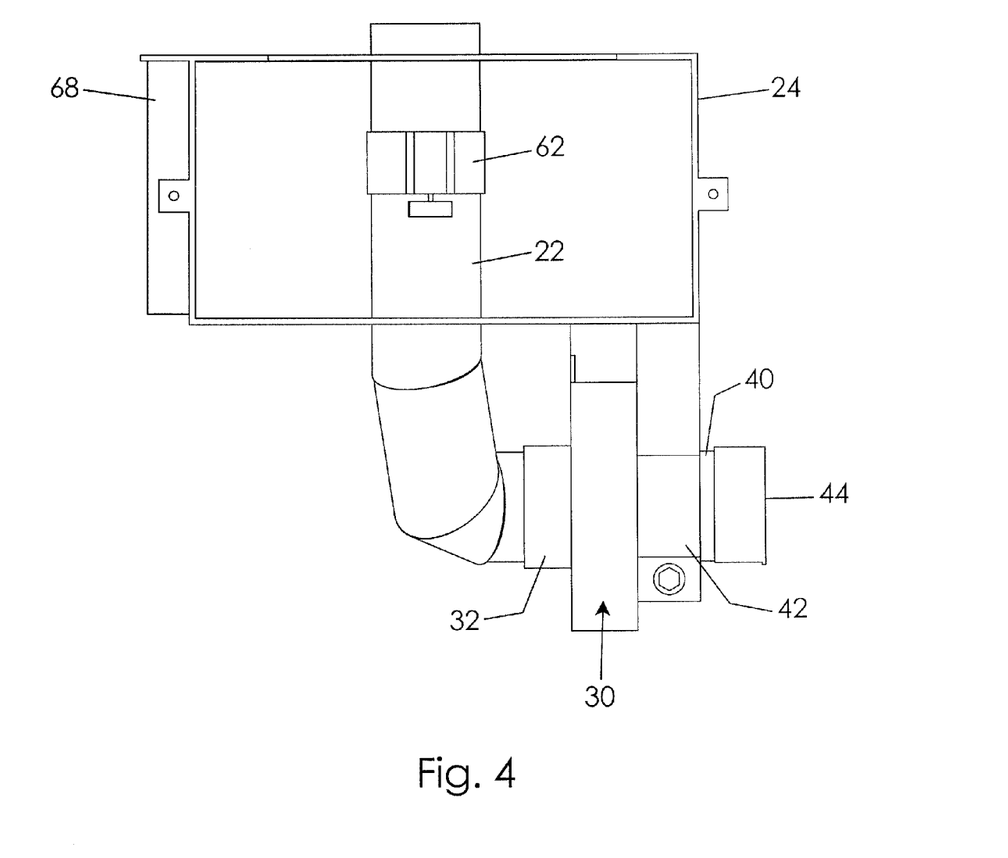
FIG. 4 is a rear view of the rotary feed dispenser apparatus as in FIG. 1 with a back plate removed from a component housing for clarity.
Figure 5A:
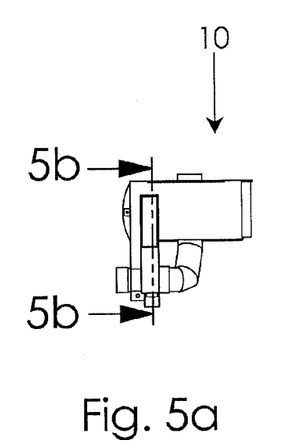
FIG. 5a is a front view of the impeller assembly.
Figure 5B:
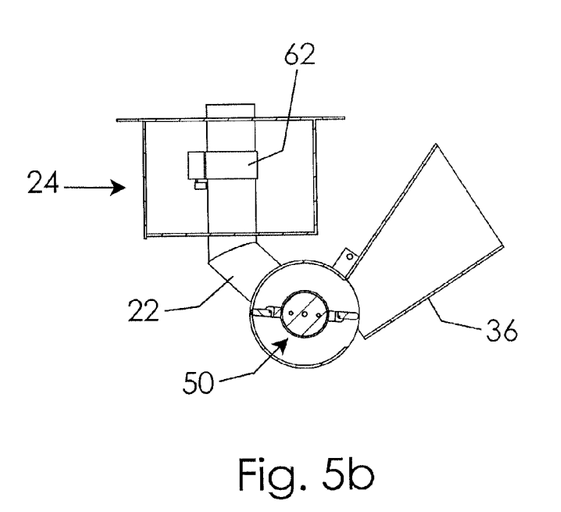

The rotary dispenser 30 is situated downstream from the reservoir 20 (FIG. 6) and operatively connected thereto. More particularly, the rotary dispenser 30 may be connected to the reservoir 20 with a feed transmission channel 22 as best shown in FIG. 4. The feed transmission channel 22 may include a generally tubular configuration that extends between the reservoir 20 and the rotary dispenser 30 so that the feed may flow smoothly therebetween. The rotary dispenser 30 may include an inlet 32 in communication with the feed transmission channel 22 and defines a rotary dispenser interior area configured to contain grain received from the reservoir 20.

The rotary dispenser 30 may also include an outlet 34 through which the feed may be ejected from the rotary dispenser interior area as will be described below. A horn 36 may be coupled to the rotary dispenser 30 at the outlet 34, the horn 36 defining an interior area and an open distal end 38 such that the feed ejected through the rotary dispenser outlet 34 is transmitted through the horn interior area and on through the horn distal end 38. The horn 36 may be mounted to swivel, pivot, or be positioned upwardly so that feed ejected therethrough is ejected upwardly into the ambient air.

Figure 3A:
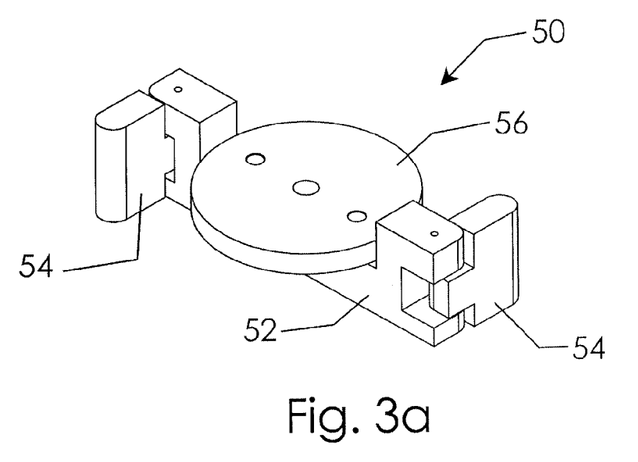
FIG. 3a is an isolated view of the impellor assembly in a folded configuration.
Figure 3B:
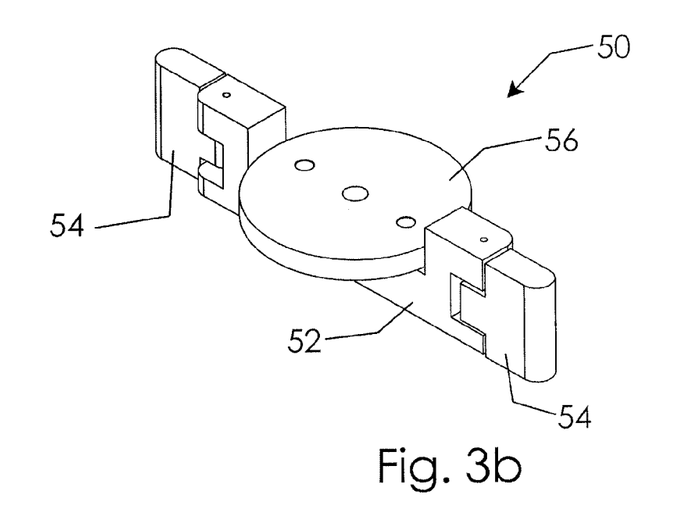
FIG. 3b is an isolated view of the impellor assembly in a an extended configuration.

The impellor assembly 50 is operatively mounted within the rotary dispenser interior area. The impellor assembly 50 includes a body portion 52 and at least one impellor end portion 54 although oppositely disposed end portions are preferred. Each impellor end portion 54 is pivotally coupled to the impellor assembly body portion 52 and selectively movable between an extended configuration sharing a common horizontal plane with the body portion 52 (FIG. 3a) and a folded configuration offset from the horizontal plane (FIG. 3a). Each end portion 54 is biased toward the extended configuration and is held there by centrifugal force during rotation, the end portion 54 being mounted to the body portion 52 with a hinge.

Figure 1:
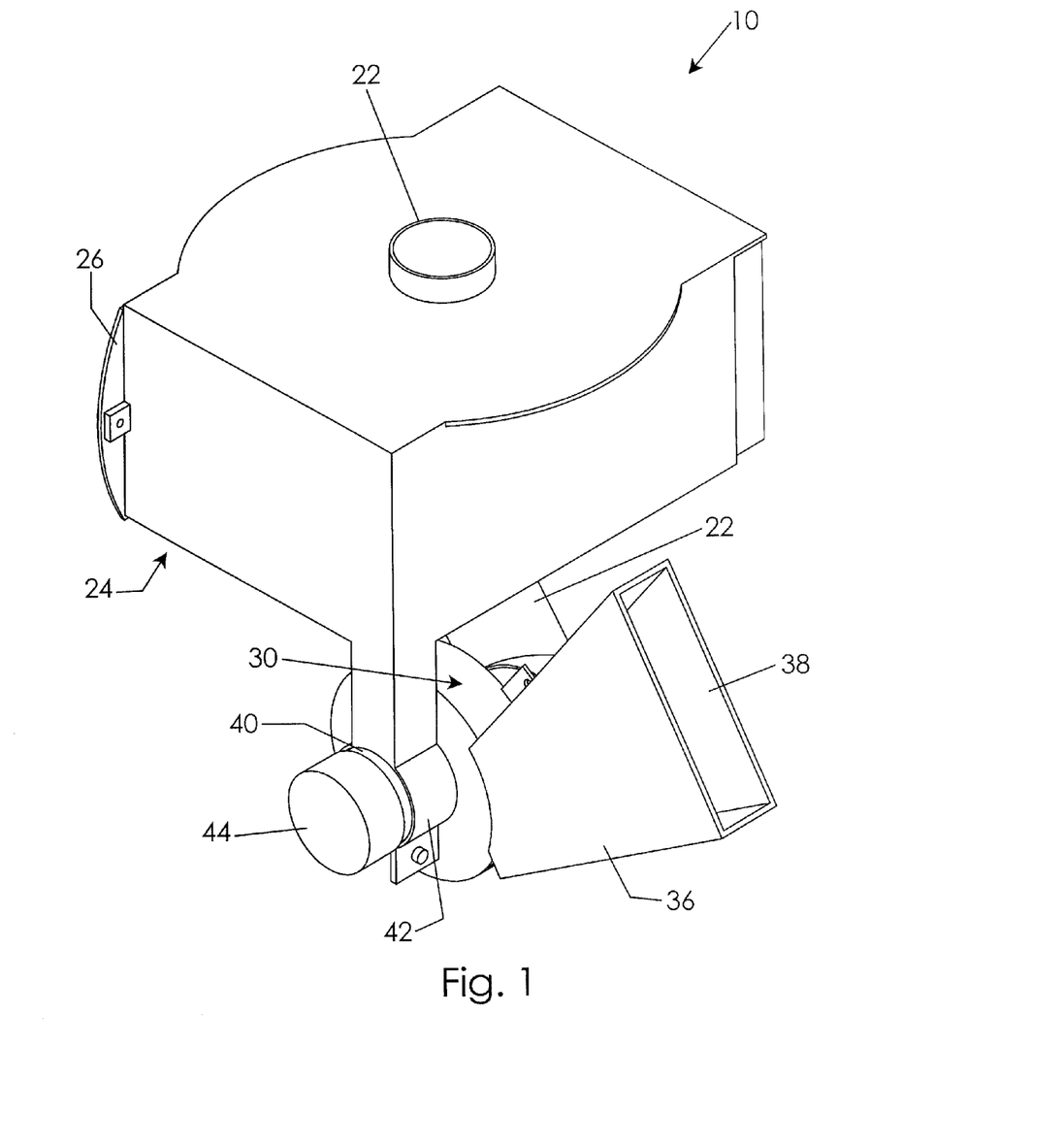
FIG. 1 is a perspective view of a rotary feed dispenser apparatus according to a preferred embodiment of the present invention.
Figure 2:
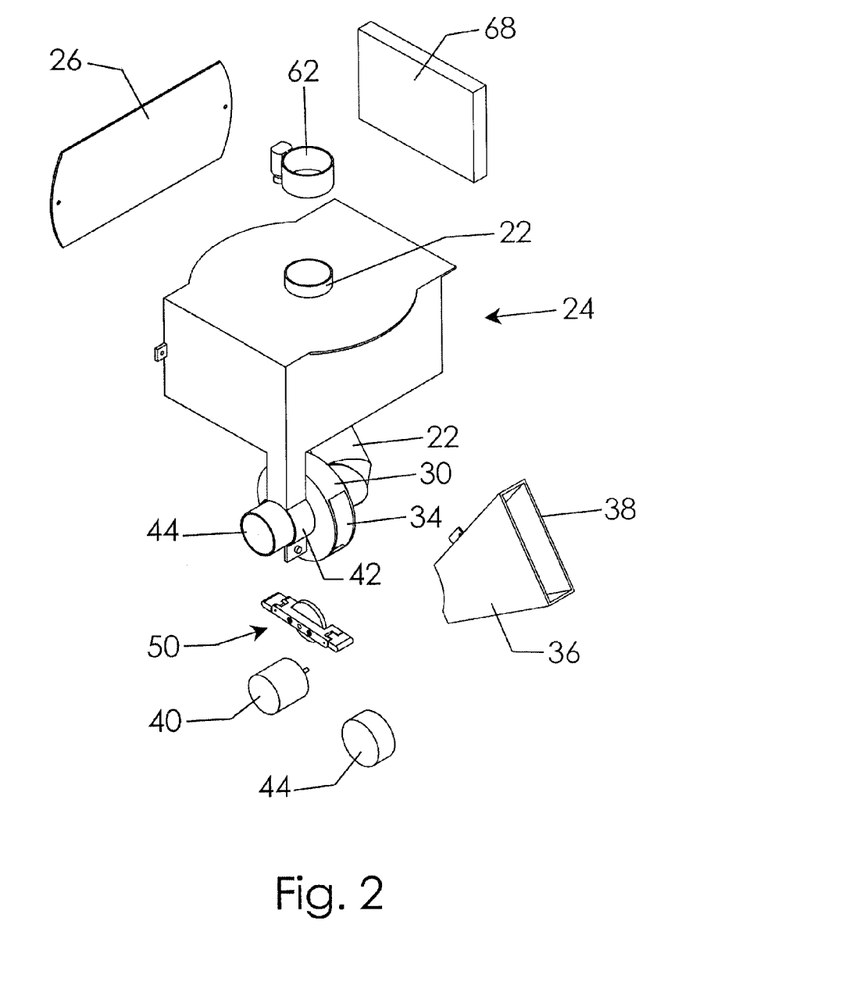
FIG. 2 is an exploded view of the rotary feed dispenser apparatus as in FIG. 1.

The impellor assembly 50 is operatively connected to the motor 40 and configured so that the impellor assembly 50 is rotated when the motor 40 is energized, such as by an electrical power source or battery. The motor 40 may be directly coupled to the rotary dispenser 30 as shown in FIG. 1 although it may be situated in the casing 24 or other locations in some embodiments. The motor 40 may be situated in a protective tube 42 having a cap 44 configured to protect the motor 40 from precipitation, animals, or other damaging elements.

More particularly, the impellor assembly 50 may include a rotation plate 56 positioned in the rotary dispenser interior area and fixedly coupled to the body portion 52 of the impellor assembly 50. The rotation plate 56 is rotatably coupled to the motor 40 such that the entire impellor assembly 50 is rotated when the motor 40 is energized. In use, feed in the rotary dispenser interior area is ejected through the rotary dispenser outlet 34 when the impellor assembly 50 is rotated by the motor 40. If the feed becomes jammed in the rotary dispenser interior area, such as by clumps or foreign objects in the feed, the impellor assembly end portions 54 will be moved by the obstruction to the folded configuration so as not to cause the motor 40 to burn up or the impellor assembly 50 to otherwise break. Rotation of the impellor assembly 50 may continue and, once the jam clears itself or is cleared by a user, the end portions 54 will automatically moved back to the normally extended configuration and feed is ejected.

The apparatus 10 may further include a casing 24 defining a casing interior area. A portion of the feed transmission channel 22 may extend through the casing interior area. The casing 24, therefore, is situated intermediate the reservoir 20 and the rotary dispenser inlet 32. The casing 24 may include a back plate 26 or door that is movable between an open configuration providing access to the casing interior area and a closed configuration preventing access to the casing interior area.

Figure 7:
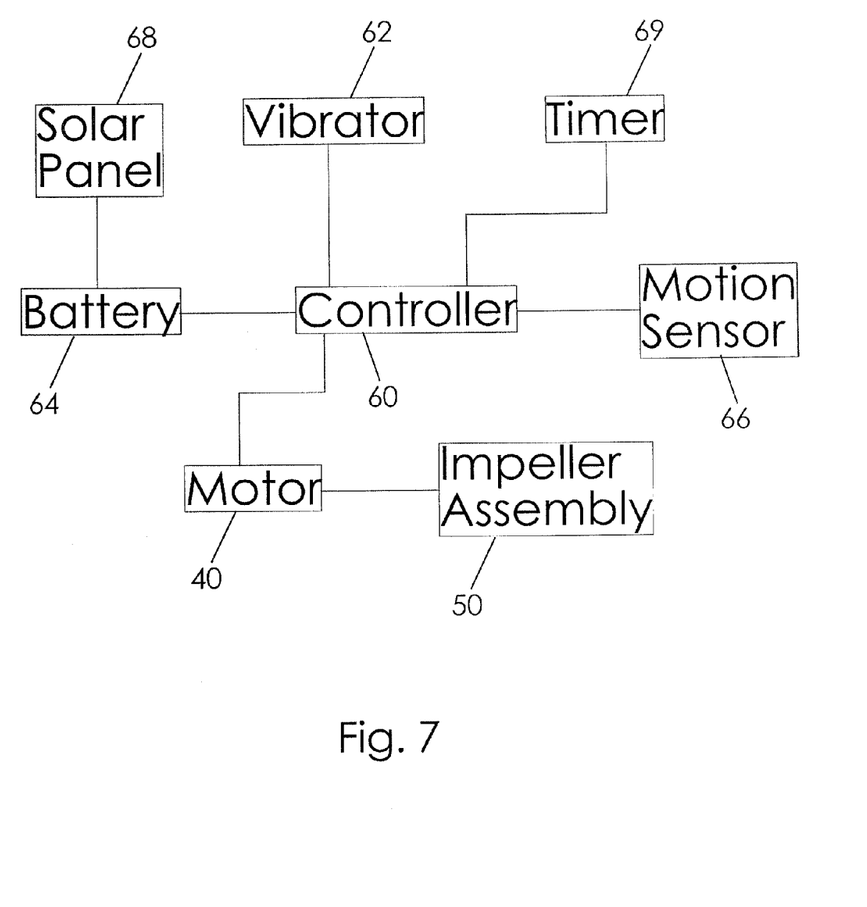
FIG. 7 is a block diagram of the electronic components of the rotary feed dispenser apparatus.

In addition, the rotary feed dispensing apparatus 10 may include the electronic components shown in FIG. 7. These components—described below—may be situated in the casing interior area so as to be protected from weather elements, vandalism, or the like. Specifically, the apparatus 10 may include a controller 60 configured to control the various other components. The controller 60 may be a processor and a memory (not shown) having programming instructions for controlling the processor and other components. Alternatively, the controller 60 may just include circuitry configured to control the other components as will be described below. The electronic components may be situated in the casing 24.

In addition, the apparatus 10 may include a battery 64 electrically connected to the controller 60 and, indirectly, to the electrical components. The controller 60 may be configured to energize the motor 40 to operate and, as a result, cause the impellor assembly 50 to rotate and eject feed as described above. Further, a timer 69 may be electrically connected to the controller 60, the timer being configured to indicate intervals of time at which the controller 60 is configured to energize the motor 40 and/or vibrator 62 (see below).

Still further, a vibrator 62 may be coupled to the feed transmission channel 22 and electrically connected to the controller 60. More particularly, the vibrator 62 may be attached to that portion of the feed transmission channel 22 extending through the casing interior area. When energized, the vibrator 62 may cause feed within the feed transmission channel to flow more smoothly, such as be breaking up any chunks, clumps, or moist areas that may impede efficient flow.

In another aspect of the apparatus 10, a motion sensor 66 may be electrically connected to the controller 60 and positioned on an exterior structure such as an outer wall of the casing 24. When the motion sensor 66 detects motion, the controller 60 may be configured to energize the motor 40 and vibrator 62 as described above. In this manner, the impellor assembly 50 may operate to eject feed when the motion of an animal is detected.

In yet another aspect, the feed dispensing apparatus 10 may include a solar panel 68 coupled to the casing 24 and electrically connected to the battery 64. In this way, the battery 64 may be recharged by solar energy collected from the sun. The electrical components of this invention can be powered almost indefinitely without repair, replacement, or supervision.

In operation, the reservoir 20 may be filled with feed and coupled to the feed transmission channel 22 as shown in FIG. 6. A certain quantity of feed will normally flow into the channel and into the rotary dispenser interior area. At an appropriate time is determined by the controller, such as when indicated by the timer 69 or motion sensor 66, the controller 60 may energize the motor 40 and vibrator 62 to operate. Operation of the motor 40 causes the impellor assembly to rotate and feed is ejected, as described above. If the impellor assembly 50 begins to jam as a result of clumps of feed or other obstruction, the end portions 54 thereof automatically move to the folded configuration until able to move back to the normally extended configuration.

It is understood that while certain forms of this invention have been illustrated and described, it is not limited thereto except insofar as such limitations are included in the following claims and allowable functional equivalents thereof.

The invention claimed is:

1. A rotary feed dispensing apparatus for use in distributing feed, comprising:
   a reservoir defining a reservoir interior area configured to hold feed;
   a rotary dispenser having an inlet operatively coupled to said reservoir and a rotary dispenser outlet, said rotary dispenser defining a rotary dispenser interior area configured to selectively receive the feed from said reservoir through said rotary dispenser inlet;

an impellor assembly rotatably mounted in said rotary dispenser interior area, said impellor assembly having an impellor body portion and at least one impellor end portion pivotally coupled to said impellor body portion;

wherein said impellor end portion is movable between an extended configuration in a common horizontal plane with said impellor body portion and a folded configuration offset from said horizontal plane;

a motor operatively coupled to said impellor assembly and configured to rotate said impellor assembly when energized; and wherein said impellor end portion is configured to eject the feed from said rotary dispenser through said outlet when said motor is energized and said impellor end portion is in said extended configuration;

a feed transmission channel extending between said reservoir and said rotary dispenser inlet that is configured to selectively communicate the feed from said reservoir interior area to said rotary dispenser;

a battery;

a controller electrically connected to said battery and to said motor;

a timer electrically connected to said controller;

a vibrator electrically connected to said controller and operatively coupled to said feed transmission channel, said vibrator configured to urge feed to flow smoothly through said feed transmission channel toward said rotary dispenser;

wherein said controller is configured to energize said vibrator and said motor at predetermined time intervals indicated by said timer.

2. The rotary feed dispensing apparatus as in claim 1, further comprising a casing situated intermediate said reservoir and said rotary dispenser, said casing defining a casing interior area configured to receive a portion of said feed transmission channel and to contain said vibrator, said battery, said controller, and said timer.

3. The rotary feed dispensing apparatus as in claim 2, wherein said casing includes a back plate movable between an open configuration allowing access to said reservoir interior area and a closed configuration preventing access to said casing interior area.

4. The rotary feed dispensing apparatus as in claim 2, further comprising a solar panel coupled to said casing and electrically connected to said battery, said solar panel configured to receive solar energy from the sun and to communicate said solar energy to said battery.

5. The rotary feed dispensing apparatus as in claim 1, wherein said impellor end portion is pivotally coupled to said impellor body portion with a hinge that is normally biased toward said extended configuration.

6. The rotary feed dispensing apparatus as in claim 1, further comprising a horn coupled to said rotary dispenser in operative communication with said rotary dispenser outlet, said horn defining a horn interior area and an open distal end such that the feed ejected through said rotary dispenser outlet is transmitted through said horn interior area and ejected through said open distal end.

7. The rotary feed dispensing apparatus as in claim 6, wherein said horn is positioned upwardly such that the feed ejected through said horn open distal end is directed upwardly into the ambient air.

8. The rotary feed dispensing apparatus as in claim 1, further comprising a motion sensor electrically connected to said controller, said controller being configured to energize said motor and said vibrator when said motion sensor detects motion.

9. The rotary feed dispensing apparatus as in claim 1, wherein said motor is selectively covered by a cap so as to protect said motor from precipitation.

10. A rotary feed dispensing apparatus for use in distributing feed, comprising:

a reservoir defining a reservoir interior area configured to hold feed;

a rotary dispenser having an inlet operatively coupled to said reservoir and a rotary dispenser outlet, said rotary dispenser defining a rotary dispenser interior area configured to selectively receive the feed from said reservoir through said rotary dispenser inlet;

an impellor assembly rotatably mounted in said rotary dispenser interior area, said impellor assembly having an impellor body portion and at least one impellor end portion pivotally coupled to said impellor body portion;

wherein said impellor end portion is movable between an extended configuration in a common horizontal plane with said impellor body portion and a folded configuration offset from said horizontal plane;

wherein said impellor assembly includes a rotation plate positioned in said rotary dispenser interior area that is rotatably coupled to said motor and configured to rotate when said motor is energized, said impellor body portion being fixedly attached to said rotation plate so as to be rotated when said motor is energized.

11. The rotary feed dispensing apparatus as in claim 10, further comprising a motion sensor electrically connected to said controller, said controller being configured to energize said motor and said vibrator when said motion sensor detects motion.

* * * * *